US005714542A

United States Patent [19]

Niinae et al.

[11] Patent Number: 5,714,542

[45] Date of Patent: Feb. 3, 1998

[54] RESIN COMPOSITION FOR ELECTROPHOTOGRAPHIC TONER

[75] Inventors: Takashi Niinae; Shinya Sasada, both of Kyoto, Japan

[73] Assignee: Sanyo Chemical Industries, Ltd., Kyoto, Japan

[21] Appl. No.: 611,821

[22] Filed: Mar. 6, 1996

[30] Foreign Application Priority Data

Mar. 6, 1905 [JP] Japan .................................... 7-074565

[51] Int. Cl.$^6$ ............................ C08L 33/18; G03G 9/087

[52] U.S. Cl. .......................... 525/108; 525/125; 525/166; 525/175; 525/179; 525/238; 430/109

[58] Field of Search .................................... 525/166, 175, 525/238, 108, 125, 179; 430/109

[56] References Cited

U.S. PATENT DOCUMENTS

| | | | |
|---|---|---|---|
| 3,644,574 | 2/1972 | Jackson | 525/175 |
| 3,787,530 | 1/1974 | Bohn | 525/175 |
| 4,224,207 | 9/1980 | Falk | 525/175 |
| 4,386,147 | 5/1983 | Scimiya et al. . | |
| 4,486,524 | 12/1984 | Fujisaki et al. . | |
| 4,499,168 | 2/1985 | Mitsuhashi . | |
| 4,987,187 | 1/1991 | Udipi | 525/173 |
| 5,496,888 | 3/1996 | Nishida | 525/63 |

*Primary Examiner*—Patricia A. Short
*Attorney, Agent, or Firm*—Oblon, Spivak, McClelland, Maier & Neustadt, P.C.

[57] ABSTRACT

A resin composition suitable for a toner, more particularly, a resin composition suitable as a binder for an electrophotographic toner is disclosed.

7 Claims, No Drawings

RESIN COMPOSITION FOR ELECTROPHOTOGRAPHIC TONER

BACKGROUND OF THE INVENTION

1. Field of the Invention

This invention relates to a resin composition suitable for a toner. More particularly, it relates to a resin composition suitable as a binder for an electrophotographic dry toner.

2. Description of the Prior Arts

In electrophotography (xerography), for fixing electrostatic latent images visualized by use of a developing toner, there have been widely used methods using fixing means of contact heating, such as those with a heated roller and those via a film or a belt between a heater and a paper or the like (for example Japanese Patent KOKAI Nos.70688/1992 and 12558/1992). In these methods, it is desired that the minimum temperature for fixing (hereinafter referred to as MFT) is low (low temperature fixing properties) and the temperature causing offset to the heated roller (hereinafter referred to as HOT) is high (anti-hot offset properties). Thermal shelf stabilities of the powder toners is also desired so as not to cause coagulation (or agglomeration) and reduction of flowability under heat evolved from fixers within electrophotographic machines.

As a binder ingredient of a dry toner, there have been used a polystyrene, a styrene-acryl copolymer, a polyester resin, an epoxy resin or the like. A polystyrene has been used for its good crushability, electrifying property and cost reduction. A polyester resin has been used to meet requirements for speeding up of copy machine, for its good fixing properties.

In order to meet these requirements such as low temperature fixing properties, anti-hot offset properties and thermal shelf stabilities, there have been proposed various techniques using toner binders having a wide range of molecular weight distribution from lower molecular weight to higher molecular.

To widen a molecular weight distribution of a vinyl resin, there have been also proposed various techniques using toner binders prepared from vinyl monomer with a small amount of a vinyl crosslinking reagent (Japanese Patent KOKAI No. 215558/1986) and toner binders having two peaks of higher molecular weight and lower molecular weight measured by gel permeation chromatography (Japanese Patent KOKOKU Nos.32180/1988 and 32382/1988). To widen a molecular weight distribution of a polyester resin, there have been proposed various techniques using toner binders prepared from oxyalkylene ether of phenol novolak (Japanese Patent KOKAI No.27478/1990) and toner binders mainly composed of heat reaction products of vinyl copolymer having hydroxyl group with noncrystalline polyester resins (Japanese Patent KOKAI No.277074/1990).

U.S. Pat. Nos. 4,386,147, 4,486,524 and 4,499,168 disclosed polymers having nitrile group, but they did not teach about storage modulus.

To maintain anti-hot offset properties of toner having crosslinking structure or mixture of high molecular weight ingredient and low molecular weight ingredient, it is needed to use a large quantity of crosslinking reagent or high molecular weight ingredient. As a result, it causes lowering crushability in producing toners because of hardness of the used binder resin, and it causes insufficiency of low temperature fixing properties because of high melt viscosity.

In these techniques, there are drawbacks, that the binders cannot sufficiently answer to fixing properties at low temperature required in recent high speed facsimile and copy machines, or to higher thermal stability and anti-hot offset properties desired accompanied with miniaturization of printers, or to higher crushability in producing toner from a viewpoint of cost reduction.

SUMMARY OF THE INVENTION

It is an object of the present invention to provide a resin composition capable of providing a toner having desired properties of crushability, high HOT and low MFT, without any inconvenience of thermal stability and electrical characteristics.

These and other objects of the invention as hereinafter will become more readily apparent having been attained broadly by a resin composition suitable for an electrophotographic toner comprising:

(A) a resin composition having a storage modulus of at least 500,000 dyne/cm$^2$ at 170° C.; and (B) a resin composition having a storage modulus of at most, 100,000 dyne/cm$^2$ at 170° C., wherein (A) comprises a polymer having a nitrile group.

DETAILED DESCRIPTION OF THE PREFERRED EMBODIMENTS

In general, a toner binder composition is composed from an ingredient having higher storage modulus such as higher molecular weight ingredient or a crosslinked ingredient, and other ingredient having lower storage modulus such as lower molecular weight ingredient. To obtain higher HOT of a toner, it is needed to raise the storage modulus of a toner binder composition. Therefore a higher amount of an ingredient of high storage modulus is used to raise a storage modulus of a toner binder composition. Using too much of an amount of an ingredient of high storage modulus causes higher MFT, and causes lower crushability in producing toner because a resin gets harder.

A polymer having a nitrile group of the present invention, has a higher storage modulus at a higher temperature than ones lacking a nitrile group. A smaller amount of (A) comprising a polymer having a nitrile group of the invention maintains a higher storage modulus than ones lacking nitrile group. A resin composition of the present invention provides a toner having higher HOT and lower MFT, and enables to realize excellent crushability in producing toner.

A storage modulus of (A) is at least 500,000 dyne/cm$^2$, preferably at least 1,000,000 dyne/cm$^2$, more preferably 2,000,000 dyne/cm$^2$, at 170° C. A storage modulus lower than 500,000 dyne/cm$^2$ results in a decrease of HOT.

A storage modulus of (B) is at most 100,000 dyne/cm$^2$, preferably at most 10,000 dyne/cm$^2$, more preferably at most 1,000 dyne/cm$^2$, at 170° C. A storage modulus higher than 100,000 dyne/cm$^2$ results in a higher MFT.

As the polymer having a nitrile group of the invention, suitable examples include; (1) polymers of (meth) acrylonitrile (acrylonitrile and/or methacrylonitrile may be used; similar expressions are used hereinafter), α-$C_{2-8}$ alkyl (for instance ethyl, propyl and butyl) acrylonitrile, α-cyano-3-hydroxycinnamic acid and α-cyano-4-hydroxycinnamic acid; (2) copolymers of nitrile group-having monomer, such as (meth) acrylonitrile, α-cyano-3-hydroxycinnamic acid, α-cyano-4-hydroxycinnamic acid, with other vinyl monomers; (3) polyester resins prepared from compounds having nitrile group and hydroxy and/or carboxyl group, such as α-cyano-3-hydroxycinnamic acid and α-cyano-4-hydroxycinnamic acid, as an essential ingredient.

Among these, preferred are (2) copolymers of a nitrile group having monomers with other monomers, more preferred are copolymers of (meth)acrylonitrile with other monomers.

Other monomers used in preparing (2) copolymers include;

(a) styrenic monomer, such as styrene, α-methylstyrene, p-methoxystyrene, p-hydroxystyrene and p-acetoxystyrene;

(b) $C_{1-18}$ alkyl (meth)acrylate, such as methyl (meth) acrylate, ethyl (meth)acrylate, butyl (meth)acrylate, 2-ethylhexyl (meth)acrylate, lauryl (meth)acrylate and stearyl (meth)acrylate;

(c) monomers having hydroxyl group, such as hydroxyethyl (meth)acrylate;

(d) (meth)acrylates having amino group, such as dimethylaminoethyl (meth)acrylate and diethylaminoethyl (meth) acrylate;

(e) vinyl esters, such as vinyl acetate;

(f) vinyl ethers, such as vinyl ethyl ether;

(g) vinyl aliphatic hydrocarbons, such as α-olefin and isoprene;

(h) unsaturated carboxylic acids, their acid anhydride and ester, such as (meth)acrylic acid, maleic anhydride, itaconic anhydride and maleic acid mono ester. Among these, preferred are (a) styrenic monomers, (b) $C_{1-18}$ alkyl (meth)acrylates and (h) unsaturated carboxylic acid and their anhydride, more preferred are styrene, methyl (meth) acrylate, ethyl (meth)acrylate, butyl (meth)acrylate, 2-ethylhexyl (meth)acrylate, lauryl (meth)acrylate and (meth)acrylic acid.

Preferred amount of (meth)acrylonitrile in (A) is in the range of 3–60% by weight, more preferred is in the range of 5–40% by weight, further preferred is in the range of 10–20% by weight. Preferred amount of nitrile group is in the range of 56–1,132 mmole, more preferred is in the range of 94–755 mmole, further preferred is in the range of 188–377 mmole per, 100 g of polymer.

A resin composition (A) can be prepared by conventional methods known to those of ordinary skill in the art. Illustrative preparation methods of (A) include a solution polymerization, a bulk polymerization and a suspension polymerization.

Illustrative polymerization initiators include azo initiator such as azobisisobutyronitrile and azobisisovaleronitrile; peroxide initiator such as benzoyl peroxide, di-t-butyl peroxide, lauroyl peroxide and dicumyl peroxide; polyfunctional initiator having at least two peroxy groups in a molecule such as 2,2-bis(4,4-di-t-butyl peroxy-cyclohexyl) propane, 1,1-bis(t-butylperoxy)-3,3,5-trimethyl cyclohexane and di-t-butyl peroxy-hexahydro terephthalate; and compounds having at least one peroxy group and at least one polymerizable unsaturated group in a molecule, such as diallyl peroxy dicarbonate and t-butyl peroxy allyl carbonate. Among these preferred is polyfunctional initiator having at least two peroxy groups in a molecule.

Illustrative solvents for preparing (A) by solution polymerization, include aromatic solvent such as toluene, xylene and ethyl benzene; ester solvent such as ethyl acetate and butyl acetate; dimethyl formamide, dimethyl sulfoxide and methyl ethyl ketone. Preferred are dimethyl formamide, xylene and toluene.

In the case of preparing (A) by suspension polymerization in water, inorganic dispersants such as calcium carbonate and calcium phosphate, and organic dispersant such as polyvinyl alcohol and methyl cellulose may be used.

Polymerization temperatures for preparing (A) are generally in the range of 50°–160° C., preferably in the range 60°–140° C.

In the course of copolymerization, it is preferred that the atmosphere is substituted by an inert gas such as nitrogen or argon.

To raise the molecular weight of (A), polyfunctional monomer having at least two polymerizable double bond may be employed in an amount not to cause gelation, generally at most 0.1% by weight based on monomers.

Illustrative polyfunctional monomers include di- or polyvinyl compound such as divinyl benzene, ethylene glycol diacrylate, 1,6-hexanediol diacrylate and divinyl toluene. Preferred are divinyl benzene, 1,6-hexanediol diacrylate and divinyl toluene.

A weight average molecular weight (hereinafter referred to as Mw) of (A) is generally in the range of 100,000–10,000,000, preferably in the range of 150,000–5,000,000, more preferably in the range of 200,000–3,000,000. Lower than 100,000 causes lower storage modulus at 170° C., and results in a poor HOT of the toner, higher than 10,000,000 causes poor crushability in the course of producing toner, and results in a higher MFT of the toner.

A number average molecular weight (hereinafter referred to as Mn) of (A) is generally in the range of 30,000–3,000,000, preferably in the range of 50,000–1,500,000, more preferably in the range of 70,000–1,000,000.

A glass transition temperature (hereinafter referred to as Tg) of (A) is generally in the range of 30°–100° C., preferably in the range of 35°–90° C., more preferably in the range of 40°–85° C. Lower than 30° C. causes a decrease in thermal shelf stability of toner, higher than 100° C. causes a higher MFT of the toner.

An amount of (A) in the toner binder composition is generally in the range of 3–50% by weight, preferably in the range of 5–40% by weight, more preferably in the range of 7–30% by weight.

Lower than 3% by weight causes a small storage modulus of the resin composition at high temperature, and results in a lower HOT of the toner, higher than 50% by weight causes poor crushability in the course of producing the toner, and results in a higher MFT of the toner.

Illustrative examples of (B) include (B2) a polyester resin, (B3) a polyurethane resin, (B4) an epoxy resin, (B5) a polyamide resin, a vinyl polymer, a cumarone resin, a ketone resin, a xylene resin, terpene resin and a phenol resin which can be prepared by conventional methods known to those of ordinary skill in the art. Among these preferred are a vinyl polymers, (B2) a polyester resin, (B3) a polyurethane resin, (B4) an epoxy resin and (B5) a polyamide resin.

Illustrative examples of vinyl polymers include (co) polymer prepared by polymerizing one or more monomers selected from the group consisting of above-mentioned vinyl monomers, and (B1) copolymer of (meth)acrylonitrile with the monomers. Among these preferred is (B1) copolymer of (meth)acrylonitrile with the monomer.

Among the monomers, preferred are styrenic monomer, $C_{1-18}$ alkyl (meth)acrylate and unsaturated carboxylic acid, more preferred are styrene, methyl (meth)acrylate, ethyl (meth)acrylate, butyl (meth)acrylate, 2-ethylhexyl (meth) acrylate, lauryl (meth)acrylate and (meth)acrylic acid.

An amount of (meth)acrylonitrile in (B1) is generally in the range of 3–60% by weight, preferably in the range of 5–40% by weight, more preferably in the range of 10–20% by weight. Preferred amount of nitrile group is in the range of 56–1,132 mmole, more preferred is in the range of 94–755 mmole, further preferred is in the range of 188–377 mmole per 100 g of polymer.

Resin (B1) may be prepared by conventional methods known to those of ordinary skill in the art. Illustrative preparation methods of (B1) include a solution polymerization, a bulk polymerization and a suspension polymerization.

To obtain lower molecular weight, preferred is a solution polymerization.

Illustrative polymerization initiators include above-mentioned initiators. Preferred are azo initiator such as azobisisobutyronitrile and azobisisovaleronitrile; peroxide initiator such as benzoyl peroxide, di-t-butyl peroxide, lauroyl peroxide and dicumyl peroxide.

Illustrative solvents of preparing (B1) by solution polymerization, include above-mentioned solvents. Preferred are dimethyl formamide, xylene and toluene.

Polymerization temperatures of (B1) are generally in the range of 80°–210° C., preferably in the range 140°–205° C.

In the course of copolymerization, it is preferred that the atmosphere is substituted by an inert gas such as nitrogen or argon.

Mw of (B1) is generally in the range of 1,000–50,000, preferably in the range of 2,000–30,000, more preferably in the range of 3,000–20,000. Lower than 1,000 causes a lower Tg, and results in a poor thermal shelf stability, higher than 50,000 causes poor crashability in the course of producing toner, and results in a higher MFT of the toner.

Tg of (B1) is generally in the range of 20°–85° C., preferably in the range of 35°–80° C., more preferably in the range of 45°–75° C. Lower than 20° C. causes a poor thermal shelf stability of the toner, higher than 85° C. causes a higher MFT of the toner.

In producing (A), it is preferred to polymerize at a lower temperature than when producing (B1), using a polyfunctional initiator.

In producing (B1), it is preferred to polymerize at a higher temperature than when producing (A), using a monofunctional initiator.

Suitable examples of (B2) polyesters are inclusive of polycondensation products of a diol with dibasic acid (or ester forming derivative thereof such as acid anhydride and lower alkyl ester), and if necessary polycarboxylic acid higher than divalent and/or polyol higher than divalent.

Monoalcohol or monocarboxylic acid may be used to block terminal carboxyl group or terminal hydroxyl group, or to control the molecular weight and reaction.

Suitable diols include low molecular weight diols, for example, (1) aliphatic dihydric alcohols (glycols), such as ethylene glycol, diethylene glycol, triethylene glycol, 1,2-propylene glycol, 1,4-butane diol, neopentyl glycol, 1,6-hexane diol, (2) phenolic diols, such as hydroquinone, catechol, resorcin, pyrogallol, bisphenols (for example, bisphenol A, bisphenol AD, bisphenol F and bisphonolsulfone), hydrogenated bisphenols, and adducts of alkylene oxide such as ethylene oxide (hereinafter referred to as EO) and propylene oxide (hereinafter referred to as PO) and combination of them which may be added blockwise or randomly, to these low molecular weight diols (1) and (2). Among these, preferred are ethylene glycol, neopentyl glycol and alkylene oxide adducts (preferably 2–3 moles adducts) of bisphenols (particularly bisphenol A), and mixtures of them. More preferred are alkylene oxide 2–3 moles adducts of bisphenol A, neopentyl glycol, and mixtures of them.

Suitable dibasic acids include dicarboxylic acids, for example, aliphatic, aromatic and cycloaliphatic ones, such as succinic, maleic, fumaric, azelaic, mesaconic, citraconic, sebacic, glutaconic, adipic, malonic, glutaric, phthalic, isophthalic, terephthalic, cyclohexane dicarboxylic, nadic and methyl-nadic acids, $C_{4-18}$ alkyl or alkenyl succinic acids (e.g. octyl succinic and dodecenyl succinic acids), and dimer acids, obtainable by dimerization of fatty acids (such as linoleic and linolenic acids); and mixture of 2 or more of these acids; as well as ester-forming derivatives of these acids, for instance, anhydrides and lower alkyl esters, such as maleic and phthalic anhydrides, dimethyl terephthalate and the like. Among these, preferred are succinic, maleic, fumalic, phthalic, isophthalic, terephthalic, and $C_{4-18}$ alkyl or alkenyl succinic acids.

Illustrative examples of polycarboxylic acid higher than divalent and/or polyol higher than divalent, include (1) aliphatic polycarboxylic acids having 7–20 carbon atoms, such as 1,2,4-butane tricarboxylic acid and 1,2,5-hexane tricarboxylic acid; (2) cycloalkyl polycarboxylic acids having 9–20 carbon atoms, such as 1,2,4-cyclohexane tricarboxylic acid; (3) aromatic polycarboxylic acids having 9–20 carbon atoms, such as 1,2,4-benzene tricarboxylic acid, 1,2,5-benzene tricarboxylic acid and pyromellitic acid; as well as ester forming derivatives of these acids, for instance, anhydrides and lower alkyl (methyl or butyl) esters. Among these, preferred are (3) aromatic polycarboxylic acids having 9–20 carbon atoms and ester-forming derivatives of these acids.

Illustrative examples of a polyol higher than divalent, include (1) $C_{3-20}$ aliphatic polyols, such as sorbitol, 1,4-sorbitan, pentaerythritol, trimethylol ethane, trimethylol methane and glycerol; (2) $C_{6-20}$ aromatic polyols, such as 1,3,5-trihydroxyl methyl benzene; (3) phenol novolac resin; (4) heterocyclic compounds having more than two active hydrogen atom such as isocyanuric acid; and adducts of alkylene oxide such as ethylene oxide and propylene oxide and combination of them which may be added blockwise or randomly, to these polyols. Among these, preferred are (1), (3) and (4), more preferred are (3) and (4).

Illustrative monocarboxylic acids include benzoic acid, p-oxybenzoic acid, toluene carboxylic acid, salicylic acid, acetic acid, propionic acid and stearic acid. Illustrative monools include benzyl alcohol, toluene-4-methanol and cyclohexanemethanol.

If necessary, an at least trivalent carboxylic acid and/or an at least trivalent alcohol may be used generally in an amount at most 35% by weight, preferably at most 25% by weight based on the weight of dicarboxylic acid.

A ratio of alcoholic hydroxy group equivalent and carboxylic group equivalent is generally in the range of 0.5–2.0, preferably in the range of 0.6–1.6 more preferably 0.7–1.4.

Polycondensation of diol with dibasic acid or ester-forming derivatives thereof can be carried out under known conditions, for instance, at a temperature of usually 150°–300° C., with or without a catalyst (such as dibutyltin oxide, stannous oxide, tetrabutyl titanate and so on), under normal or reduced pressure, in the absence of or in the presence of an inert gas or solvent.

An acid number of (B2) is generally 0.2–200 mgKOH/g, preferably 0.5–150 mgKOH/g, and a hydroxyl number of (B2) is generally 0.2–200 mgKOH/g, preferably 0.5–150 mgKOH/g.

Mw of (B2) is generally 1,000–100,000, preferably 1,500–50,000, more preferably 2,000–30,000.

Tg of (B2) is generally 20°–85° C., preferably 35°–80° C., more preferably 45°–75° C. Lower than 20° C. causes a poor thermal shelf stability of the toner, higher than 85° C. causes a higher MFT of the toner.

Suitable examples of (B3) a polyurethane resin of the invention are inclusive of polyaddition products of a polyisocyanate and a polyol. Monool or monoisocyanate may be employed to block terminal isocyanate or terminal hydroxyl groups.

Suitable polyisocyanates include, for example, (1) aromatic polyisocyanates, such as toluene diisocyanate (TDI), dimethyl diphenyl methane diisocyanate (MDI), modified MDI, naphthalene diisocyanate and xylene diisocyanate; (2) polymeric aromatic polyisocyanate, such as a dimer or trimer of TDI or MDI; (3) NCO terminated urethane prepolymer prepared by reacting low molecular weight polyols, for instance trimethylol propane, with excess aromatic polyisocyanate, for instance TDI; (4) aliphatic polyisocyanate, such as tetramethylene diisocyanate, hexamethylene diisocyanate, isophorone diisocyanate (IPDI) and dicyclohexyl methane diisocyanate; (5) polymeric aliphatic polyisocyanate, such as a trimer of IPDI. Among those preferred are TDI, MDI and IPDI.

Suitable polyols include above-mentioned diols, polyols of trivalent or more, and other polyols. Other polyols include (1) polyether diols of molecular weight of 500–3,000, such as polytetramethylene glycol, polyethylene glycol and polypropylene glycol; (2) polyester diols having a terminal hydroxyl group of molecular weight of 500–3.000, prepared by polycondensing dibasic carboxylic acids, such as adipic acid, maleic acid and phthalic acid, with low molecular weight diols, such as ethylene glycol, diethylene glycol, 1,4-butane diol and 1,6-hexane diol. Preferred diols are EO and/or PO 2–4 moles adducts of bisphenol A.

A molar ratio of polyisocyanate and polyol is generally 0.5–1.5, preferably 0.6–1.4, more preferably 0.7–1.3.

A reaction temperature is generally 40°–130° C. A catalyst such as dibutyl tin dilaurate and stannous octoate may be used.

Mw of (B3) is generally 1,000–100,000, preferably 1,500–50,000, more preferably 2,000–30,000.

Tg of (B3) is generally 20°–85° C., preferably 35°–80° C., more preferably 45°–75° C. Lower than 20° C. causes a poor thermal shelf stability of the toner, higher than 85° C. causes a higher MFT of the toner.

Suitable examples of (B4) an epoxy resin include bisphenol A-type epoxy resin, bisphenol F-type epoxy resin, phenol novolak-type epoxy resin, polyphenol-type epoxy resin, polyglycidyl-type epoxy resin and reaction products of these epoxy resins with above-mentioned dibasic carboxylic acids and/or monobasic carboxylic acids.

Mw of (B4) is generally 1,000–100,000, preferably 1,500–50,000, more preferably 2,000–30,000.

Tg of (B4) is generally 20°–85° C., preferably 35°–80° C., more preferably 45°–75° C. Lower than 20° C. causes a poor thermal shelf stability of the toner, higher than 85° C. causes a higher MFT of the toner.

Suitable examples of (B5) a polyamide resin of the invention can be prepared by known method, such as reacting polybasic carboxylic acids with polyvalent amines, with or without monobasic carboxylic acids or monoamines.

Illustrative polybasic carboxylic acids include dimer acids obtainable by polymerization of fatty acids, for instance oleic and linoleic acid, and above-mentioned dibasic carboxylic acids.

Illustrative polyamines include (1) aliphatic polyamines, such as ethylene diamine, diethylene triamine, triethylene tetramine, 1,2-diamino propane, 1,3-diamino propane and hexamethylene diamine; (2) alicyclic polyamines, such as isophorone diamine and cyclohexylene diamine; (3) aromatic polyamines, such as xylene diamine and diamino diphenyl methane. Among these, preferred is (1) aliphatic polyamines.

Illustrative monobasic carboxylic acids include above-mentioned monobasic carboxylic acids and mixed fatty acids, such as fatty acids from palm oil, tall oil, soybean oil and tallow oil.

Illustrative monoamines include n-propyl amine, stearyl amine, oleyl amine and monoethanol amine.

An equivalent ratio of carboxylic acid groups and amine groups is, generally in the range of 0.5–1.5, preferably in the range of 0.6–1.4, more preferably in the range of 0.7–1.3.

Reaction of carboxylic acids with amines can be carried out under known conditions, for instance, at a temperature of usually 140°–250° C., preferably 180°–230° C., and usually in the presence of a inert gas, for instance nitrogen or argon, to prevent coloring.

Melting point of (B5) is generally in the range of 20°–150° C., preferably 40°–140° C., more preferably 60°–120° C. Less than 20° C. causes a worse thermal shelf stability of the toner, over 150° C. causes a higher MFT of the toner.

(B) may be composed by one or more resins. From the viewpoint of anti-offset properties however, it is preferred that (A) is essentially compatible with a continuous domain of the resin composition.

Among these (B), preferred are (1) (B1), (2) at least one resin selected from the group consisting of (B2)–(B5), (3) (B1) and at least one resin selected from the group consisting of (B2)–(B5), more preferred is a combination of (B1) and (B2). From the viewpoint of low temperature fixing property it is preferred that an amount of (B2) is greater than (B1), from the viewpoint of anti-offset property it is preferred that an amount of (B1) is greater than (B2). In case that (B) is composed by at least two resins, some may be dispersed in a continuous domain of the resin composition.

A blending method of (A) with (B) is well-known, such as kneading them under melt, blending them in the presence of solvent followed by distillation and polymerizing one in the presence of another.

In general, a compatibility of (A) with a continuous domain of the resin composition can be found by inspection of the resin composition. In the case that the appearance of the resin composition is transparent, (A) is compatible with continuous domain of the resin composition. In the case that the appearance of the resin composition is cloudy, (A) is not compatible and/or some of (B) is not compatible with a continuous domain of the resin composition. More precisely, the compatibility can be found by photographs of section of the resin composition, photographed by a scanning electron micromicroscope, such as S-800, produced by Hitachi Corporation, or by a transparent electron microscope, at 1,000–30,000 of magnifying power. A kind of dispersed resin is determined by observation of photographs of resin compositions which are composed from various weight ratios of resins.

Mw of the resin composition of the invention is generally in the range of 10,000–1,000,000, preferably in the range of 50,000–800,000, more preferably in the range of 100,000–500,000.

Mn of the resin composition is generally in the range of 1,000–50,000, preferably in the range of 2,000–40,000, more preferably in the range of 2,500–30,000.

Mw/Mn of the resin composition is generally in the range of 10–1,000, preferably in the range of 15–500, more preferably in the range of 20–100.

The resin composition of the invention may contain low molecular weight polyolefins (such as polyethylene, polypropylene and ethylene-propylene copolymer which contains 0.1–15% by weight of ethylene) in an amount of 0.1–10%, preferably 0.5–8%, more preferably 1–6%, based on the total weight of the resin composition to improve the anti-offset property of the toner.

Previous blending of a low molecular weight polyolefin with the resin composition results in homogeneous dispersion of the low molecular weight polyolefin into the toner, and results in an improvement of thermal shelf stability of the toner.

Illustrative adding methods of low molecular weight polyolefin include (1) adding it in the course of blending (A) with (B), (2) polymerizing (B) in the presence of it, (3) adding it in the course of blending (A) with (B) prepared by method (2).

Mn of low molecular weight polyolefin is generally in the range of 1,000–10,000. Mw is in the range of 3,000–50,000.

Low molecular weight polyolefin can be produced by thermal degradation of high molecular weight polyolefin.

Measurement of molecular weight of the resin composition is carried out without the low molecular weight polyolefin. A compatibility of (A) and/or (B) is carried out without low molecular weight polyolefin, for appearance of low molecular weight polyolefin containing resin composition is cloudy.

Formulations of electrophotographic toners, wherein the resin composition of the present invention is used, include, for example, ones comprising generally 45–95% by weight of the binder composition, 5–10% by weight of known colorants, (such as carbon black, iron black, benzidine yellow, quinacridone, rhodamine B, phtharocyanine and the like), and generally 0–50% by weight of magnetic powders, (such as iron, cobalt, nickel, hematite, ferrite and the like).

In addition, there may be contained various additives (for example, charge controllers (such as metal complexes and nigrosine), lubricants (such as polytetrafluoroethylene, low molecular weight polyolefins, fatty acids and metal salts or amide thereof), and so on). The amount of these additives is usually 0–10% by weight based on the weight of toner.

Electrophotographic toner can be prepared by dry blending these components and then kneading under melt, followed by crushing and then finely pulverizing with a grinder, such as a jet grider, into fine particles of 5–20 μm diameter.

The electrophotographic toner can be optionally mixed with carrier particles, such as iron powder, glass beads, nickel powder, ferrite and the like, and used as a developer for electrical latent images. In addition, a hydrophobic colloidal silica powder may be used to improve flowability of the powders.

The electrophotographic toner can be used by fixing on substrates (such as paper, polyester film and the like). Fixation means are mentioned above.

Having generally described the invention, a more complete understanding can be obtained by reference to certain specific examples, which are included for purposes of illustration only and not intended to be limiting unless otherwise specified.

In the following examples, parts and ratio means parts by weight and weight ratio, respectively.

Measuring methods and conditions are as follows:

(1) Molecular weight measurement with GPC:

Equipment: SYSTEM-11, produced by Showa Denko Inc.

Column: TSK gel GMHXL, 2 columns, produced by Toyo Soda Mfg.

Temperature: 40° C.

Sample solution 0.25% of THF solution.

Amount of solution: 100 microliters.

Detector: Refractometer.

Mw calibration curve is prepared using standard polystyrene.

(2) Tg:

Equipment: DSC20, SSC/580, produced by Seiko Electronics.

Conditions: ASTM D3418-2.

(3) Storage modulus:

Equipment: RDS-II Dynamics Spectrometer produced by Rheometrics Inc.

Test fixture: cone and plate, 25 mmϕ

Frequency: 20 Hz (125.6 rad/sec).

Coefficient of strain: fixed at 5%.

PREPARATION EXAMPLES OF RESIN

(1) Preparation Example 1

A reactor equipped with a thermometer, a stirrer, a condenser and a inlet tube of nitrogen, was charged with 1,425 parts of water and 9 parts of polyvinyl alcohol, after dissolving sufficiently, was charged with a monomer mixture of 200 parts of acrylonitrile, 516 parts of styrene, 284 parts of 2-ethyl hexyl acrylate and 2.3 parts of di-t-butyl peroxy hexahydroterephthalate. Then suspension polymerization was carried out for 10 hours at 85° C., additionally for 3 hours at 98° C. The obtained polymerization mixture was cooled, filtered, washed with water, dried at 55° C. to obtain a resin (A-1) having Mw of 900,000, Mn of 300,000, Tg of 60° C. and a storage modulus at 170° C. of $3.2\times10^6$ dyne/$cm^2$.

(2) Preparation Example 2

As a same manner of Preparation example 1, except using a monomer mixture of 815 parts of styrene and 185 parts of 2-ethyl hexyl acrylate, a resin (C-1) was obtained. (C-1) had a Mw of 700,000, Mn of 260,000, Tg of 62° C. and a storage modulus at 170° C. of $1.1\times10^6$ dyne/$cm^2$.

(3) Preparation Example 3

A reactor equipped with a thermometer, a stirrer, a condenser and a inlet tube of nitrogen, was charged with 2,033 parts of water and 2.6 parts of polyvinyl alcohol, after dissolving sufficiently, was charged with a monomer mixture of 140 parts of acrylonitrile, 677 parts of styrene, 183 parts of lauryl methacrylate, and 2.8 parts of di-t-butyl peroxy hexahydroterephthalate and 0.6 part of benzoyl peroxide. Then suspension polymerization was carried out for 10 hours at 77° C. additionally for 3 hours at 98° C. The obtained polymerization mixture was cooled, filtered, washed with water, dried at 55° C. to obtain a resin (A-2) having Mw of 1,030,000, Mn of 380,000, Tg of 70° C. and a storage modulus at 170° C. of $4.0\times10^6$ dyne/$cm^2$.

(4) Preparation Example 4

An autocleave equipped with a thermometer, stirrer and inlet tube of nitrogen, was charged with 400 parts of xylene, 140 parts of acrylonitrile, 677 parts of styrene, 183 parts of lauryl methacrylate, 0.2 part of 1,6-hexanediol diacrylate and 2 parts of 2,2-bis(4,4-di-t-butyl peroxycyclohexyl) propane.

After substituting an atmosphere with nitrogen, a polymerization was carried out for 2 hours at 90° C., additionally for 3 hours at 110° C. Then a mixture of 1 part of di-t-butyl peroxide and 30 parts of xylene was charged dropwise for 30 minutes at 150° C., followed by distillation of solvent, to obtain a resin (A-3) having Mw of 550,000, Mn of 70,000, Tg of 64° C. and a storage modulus 170° C. of $1.0\times10^6$ dyne/$cm^2$.

(5) Preparation Example 5

An autocleave equipped with a thermometer, stirrer and inlet tube of nitrogen, was charged with 646 parts of xylene.

After substituting an atmosphere with nitrogen, a monomer mixture of 200 parts of acrylonitrile, 686 parts of styrene and 114 parts of 2-ethyl hexyl acrylate, and a mixture of 118 parts of xylene and 52 parts of di-t-butyl peroxide were dropped into the autocleave, simultaneously for 3 hours at 170° C., followed by distillation of solvent, to obtain a resin (B1-1) having Mw of 4,700, Mn of 2,300, Tg of 55° C. and a storage modulus at 170° C. of at most 1,000 dyne/cm$^2$.

(6) Preparation Example 6

As a same manner of Preparation example 5, except using a monomer mixture of 720 parts of styrene, 110 parts of lauryl methacrylate, 160 parts of acrylonitrile and 10 parts of acrylic acid, and except using an initiator of 36 parts of di-t-butyl peroxide, a resin (B1-2) was obtained. (B1-2) had Mw of 6,300, Mn of 2,800, Tg of 58° C., an acid value of 8 mgKOH/g and a storage modulus at 170° C. of at most 1,000 dyne/cm$^2$.

(7) Preparation Example 7

As a same manner of Preparation example 5, except using a monomer mixture of 730 parts of styrene, 110 parts of lauryl methacrylate and 160 parts of acrylonitrile, and except using an initiator of 36 parts of di-t-butyl peroxide, a resin (B1-3) was obtained. (B1-3) had Mw of 6,800, Mn of 2,870, Tg of 57° C. and a storage modulus at 170° C. of at most 1,000 dyne/cm$^2$.

(8) Preparation Example 8

As a same manner of Preparation example 5, except using a monomer mixture of 960 parts of styrene and 40 parts of 2-ethylhexyl acrylate, a resin (B6-1) was obtained. (B6-1) had Mw of 4,600, Mn of 2,260, Tg of 56° C. and a storage modulus at 170° C. of at most 1,000 dyne/cm$^2$.

(9) Preparation Example 9

A polyester resin (B2-1) was obtained by polycondensation of 367 parts of isophthalic acid with 1,000 parts of bisphenol A PO 2 moles adduct, at 230° C. (B2-1) had Mw of 5,400, Mn of 2,600, Tg of 57° C. and a storage modulus at 170° C. of at most 1,000 dyne/cm$^2$.

(10) Preparation Example 10

A polyester resin (B2-2) was obtained by polycondensation of 386 parts of terephthalic acid with 1,000 parts of bisphenol A EO 2 moles adduct, at 230° C. (B2-2) had Mw of 4,000, Mn of 2,200, Tg of 49° C. and a storage modulus at 170° C. of at most 1,000 dyne/cm$^2$.

(11) Preparation Example 11

A polyester resin (B2-3) was obtained by polycondensation of 236 parts of terephthalic acid, 697 parts of bisphenol A PO 2 moles adduct with 67 parts of dodecenyl succinic acid, at 230° C. (B2-3) had Mw of 7,300, Mn of 3,800, Tg of 61° C. and a storage modulus at 170° C. of at most 1,000 dyne/cm$^2$.

(12) Preparation Example 12

A polyurethane resin (B3-1) was obtained by reacting 406 parts of MDI with 1,000 parts of bisphenol A EO 2 moles adduct, at 150° C. (B3-1) had Mw of 2,700, Mn of 1,300, Tg of 49° C. and a storage modulus at 170° C. of at most 1,000 dyne/cm$^2$.

(13) Preparation Example 13

A reactor was charged with 831 parts of epoxy resin (Epicote 1002 produced by Yuka Shell Epoxy), 169 parts of benzoic acid, 2 parts of tetrabutyl ammonium bromide and 120 parts of xylene. A reaction was carried out for 4 hours at 150° C., followed by distillation to obtain an epoxy resin (B4-1). (B4-1) had Mw of 3,500, Mn of 2,040, Tg of 52° C. and a storage modulus at 170° C. of at most 1,000 dyne/cm$^2$.

(14) Preparation Example 14

A polyamide resin (B5-1) was obtained by polycondensation of 246 parts of dimer acid, 9 parts of acetic acid, 18 parts of benzoic acid with 60 parts of ethylene diamine at 230° C. (B5-1) had a melting point of 110° C. and a storage modulus at 170° C. of at most 1,000 dyne/cm$^2$.

PREPARATION EXAMPLES OF RESIN COMPOSITION

Examples 1–10

A flask equipped with a condenser and stirrer, was charged with 120 parts of DMF and constituents shown in Table 1. After substituting an atmosphere with nitrogen, the mixture was stirred for 2 hours at 150° C., followed by distillation of DMF to obtain resin compositions (TB-1)–(TB-10) of the invention.

TABLE 1

| Constituents of Resin Compositions | | | |
|---|---|---|---|
| Example No. | Resin Composition | Resin (A) (parts) | Resin (B) (parts) |
| 1 | TB-1 | A-1 (15) | B1-1 (85) |
| 2 | TB-2 | A-2 (10) | B1-2 (90) |
| 3 | TB-3 | A-2 (15) | B1-3 (55), B2-1 (30) |
| 4 | TB-4 | A-2 (15) | B1-3 (25), B2-3 (60) |
| 5 | TB-5 | A-3 (35) | B2-3 (65) |
| 6 | TB-6 | A-2 (25) | B1-2 (45), B2-3 (30) |
| 7 | TB-7 | A-2 (15) | B1-2 (55), B3-1 (30) |
| 8 | TB-8 | A-2 (15) | B1-2 (55), B4-1 (30) |
| 9 | TB-9 | A-2 (15) | B1-2 (55), B5-1 (30) |
| 10 | TB-10 | A-2 (10) | B1-2 (90), *P (3.4) |

*P: low molecular weight polyolefin (Viscol 550P, produced by Sanyo Chemical Industries Ltd.

Comparative Examples 1–6

As a same manner of Example 1 except using constituents shown in Table 2, resin compositions (TB-11)–(TB-16) were obtained.

TABLE 2

| Constituents of Resin Compositions | | | |
|---|---|---|---|
| Comparative Example No. | Resin Composition | Resin (A) (parts) | Resin (B) (parts) |
| 1 | TB-11 | C-1 (15) | B6-1 (85) |
| 2 | TB-12 | C-1 (35) | B6-1 (65) |
| 3 | TB-13 | C-1 (15) | B1-1 (85) |
| 4 | TB-14 | C-1 (15) | B1-3 (55), B2-1 (30) |
| 5 | TB-15 | C-1 (35) | B2-3 (65) |
| 6 | TB-16 | C-1 (15) | B1-2 (55), B-3 (30) |

Mw, Mn, Mw/Mn and Tg of resin compositions are shown in Table 3.

TABLE 3

| Resin Composition | Mw | Mn | Mw/Mn | Tg (°C.) |
|---|---|---|---|---|
| TB-1 | 143,000 | 2,770 | 51.6 | 56 |
| TB-2 | 100,000 | 2,500 | 40.0 | 59 |
| TB-3 | 146,000 | 2,980 | 49.0 | 59 |
| TB-4 | 150,000 | 3,000 | 50.0 | 61 |
| TB-5 | 185,000 | 3,440 | 53.8 | 62 |
| TB-6 | 270,000 | 3,700 | 73.0 | 61 |
| TB-7 | 141,000 | 2,590 | 54.4 | 57 |
| TB-8 | 140,000 | 2,610 | 53.6 | 58 |
| TB-9 | 143,000 | 2,600 | 55.0 | 60 |
| TB-10 | 178,000 | 2,950 | 60.3 | 59 |
| TB-11 | 105,000 | 2,600 | 40.4 | 57 |
| TB-12 | 245,000 | 3,500 | 70.0 | 58 |
| TB-13 | 103,000 | 2,620 | 39.3 | 56 |
| TB-14 | 110,000 | 2,560 | 43.0 | 57 |
| TB-15 | 250,000 | 4,240 | 59.0 | 61 |
| TB-16 | 104,000 | 2,680 | 38.8 | 56 |

Preparation of Toners

To 88 parts of each resin composition without TB-10, were added and homogeneously mixed 7 parts of carbon black (MA100 produced by Mitsubishi Chemical Industries), 3 parts of a low molecular weight polypropylene (Viscol 550P, produced by Sanyo Chemical Industries) and 2 parts of a charge controller (Spironblack TRH produced by Hodogaya Chemical Co.), and thereafter kneaded with a twin-screw extruder of bulk temperature 150° C., followed by finely pulverizing the cooled kneaded mixture with a jet mill and then classifying with a dispersion separator to obtain toners (a)–(o) of average diameter of 12 μm.

To 91 parts of the resin composition TB-10, were added and homogeneously mixed 7 parts of carbon black (MA100 produced by Mitsubishi Chemical Industries) and 2 parts of a charge controller (Spironblack TRH produced by Hodogaya Chemical Co.), and thereafter treated as above-mentioned to obtain toners (p) of average diameter of 12 μm.

Evaluation of Toners (1) Each toner particle (having particle size of 8.6 mesh pass and 30 mesh on) kneaded with a twin-screw extruder and then cooled, was finely pulverized with a jet mill under controlled condition. Average diameters of the pulverized powders were measured, as they were, with coulter counter, for measurement of crushability.

(2) To 3 parts of each toner were added and homogeneously mixed 97 parts of ferrite carrier (F-100 produced by Powdertech Co.), and fixing test was carried out as follows.

By using a commercially available copy machine (BD-7720 produced by Toshiba Corp.), toner image was transferred onto paper, and then the transferred toner on the paper was fixed at a speed of 35 sheets (A4 size)/minute with use of another commercially available copy machine (SF8400A produced by Sharp Corp.), whose fixing parts had been modified.

(3) Each toner was put into a polyethylene bottle, and maintained at 45° C. within a constant temperature water bath for 8 hours. Then resulting toner was removed into a sieve of 42 mesh and shaken for 10 seconds using a powder tester (produced by Hosokawamicron, Co.). By measuring the weight % of the toner remained on the sieve, thermal shelf stability was evaluated. The smaller the weight % is, the better the thermal shelf stability is.

(4) Into a 50 $cm^3$ glass bottle, 3 parts of each toner and 97 parts of ferrite carrier (F-100 produced by Powdertech Co.) were charged, and allowed to stand for 12 hours within a temperature and humidity controlled room of 25° C. and 50% R.H. Then, the resulting toner was stirred for 30 minutes at 100 r.p.m. with a tubular shaker mixer under conditions of 25° C. and 50% R.H. to be electrostatically charged by friction. Thereafter, the charge-to-mass ratio (hereinafter referred to as CMR) of tribo-charged toner was measured with a blow-off charge amount measuring device (produced by Toshiba, Corp.). The test results were shown in Table 4.

TABLE 4

The Test Results of Toners

| | Resin Composition | MFT (°C.) *1 | HOT (°C.) *2 | Thermal shelf Stability (%) | CMR (μC/g) | *3 Average Particle Size (μm) |
|---|---|---|---|---|---|---|
| | | | Examples | | | |
| a | TB-1 | 140 | >220 | 31 | −21 | 11 |
| b | TB-2 | 138 | >220 | 28 | −21 | 9 |
| c | TB-3 | 136 | >220 | 28 | −20 | 11 |
| d | TB-4 | 135 | >220 | 27 | −20 | 11 |
| e | TB-5 | 140 | >220 | 26 | −22 | 12 |
| f | TB-6 | 138 | >220 | 27 | −22 | 11 |
| g | TB-7 | 136 | >220 | 30 | −22 | 11 |
| h | TB-8 | 137 | >220 | 29 | −21 | 11 |
| i | TB-9 | 138 | >220 | 27 | −22 | 11 |
| p | TB-10 | 137 | >220 | 27 | −22 | 12 |
| | | | Comparative Examples | | | |
| j | TB-11 | 140 | 180 | 30 | −21 | 11 |
| k | TB-12 | 147 | >220 | 30 | −21 | 15 |
| l | TB-13 | 140 | 150 | 31 | −20 | 11 |
| m | TB-14 | 140 | 160 | 30 | −20 | 11 |
| n | TB-15 | 140 | 150 | 27 | −20 | 11 |
| o | TB-16 | 138 | 160 | 32 | −20 | 11 |

*1: the temperature of the heated roller providing printed image density of solid part remained at least 70% after 5 times reciprocating rubbing of black solid part of printed image density 1.2 with a Gakushin fastness tester (rubbed part is paper).
*2: the temperature of the heated roller at the time when toner was hot offset.
*3: evaluation for crushability As shown in Table 4, toners of Examples a–i and p of the invention exhibited well balanced low temperature fixability, off set properties and crushability as compared with toners of Comparative Examples j–o, and normal thermal shelf stability and charge characteristics.

Obviously, numerous modification and variations of the present invention are possible in light of the above teachings. It is therefore to be understood that within the scope of the appended claims, the invention may be practiced otherwise than as specifically described herein.

This application is based on JP 74565/1995, filed in Japan on Mar. 6, 1995, the entire contents of which are hereby incorporated by reference.

What is claimed as new and desired to be secured by Letters Patent of the United States is:

1. A resin composition (R) suitable for electrophotographic toner comprising:

(A) 3–50% by weight of a resin composition having a storage modulus of at least 500,000 dyne/$cm^2$ at 170° C., and (B) a resin composition having a storage modulus of at most 100,000 dyne/$cm^2$ at 170° C., with or without (C) 0.1–10% by weight of a low molecular weight polyolefin, the weights of (A) and (C) being calculated as percentage of the total weights of (A), (B) and (C) present in (R), wherein (A) comprises a polymer having nitrile groups in the range of 56–1,132 mmoles per 100 g of (A), wherein said resin composition (R) has a weight average molecular weight (Mw) in the range of 10,000–1,000, 000, a number average molecular weight (Mn) in the range of 1,000–50,000, and a ratio of Mw/Mn in the range of 10–1,000, wherein (A) is a polymer having a weight average molecular weight (Mw) in the range of 100,000–10,000,000 and a number average molecular weight (Mn) in the range of 30,000–3,000,000, and is a polymer having a glass transition temperature (Tg) in the range of 30° C.–100° C., wherein (B) is (B1) a copolymer of acrylonitrile and/or metharylonitrile, or a mixture thereof with a resin selected from the group consisting of (B2) a polyester resin, (B3) a polyurethane resin, (B4) an epoxy resin, and (B5) a polyamide resin, and (B1) contains 56–1,132 mmoles of nitrile group per 100 g, wherein the amount of acrylonitrile and/or metharylonitrile units in (B1) is in the range of 3–60% by weight, wherein (B1) has a weight average molecular weight (Mw) in the range of 1,000–50,000 and has glass transition temperature (Tg) in the range of 20° C.–85° C., (B2) has a weight average molecular weight in the range of 1,000–100,000 and a Tg of 20° C.–85° C., (B3) has a weight average molecular weight (Mw) in the range of 1,000–100,000, and a Tg of 20° C.–85° C., (B4) has a weight average molecular weight (Mw) in the range of 1,000–100,000, and a Tg of 20° C.–85° C. and (B5) has a melting point in the range of 20°–150° C.

2. The composition of claim 1, wherein resin (A) is a polymer or copolymer of a monomer, having a nitrile group.

3. The composition of claim 1, wherein (A) is a copolymer of acrylonitrile or methacrylonitrile with styrene and a $C_{1-18}$ alkyl acrylate or methacrylate, with or without an unsaturated carboxylic acid.

4. The composition of claim 3, wherein (B) is (B1) alone.

5. The composition of claim 4, wherein (B1) is a copolymer of acrylonitrile or methacrylonitrile with styrene and a $C_{1-18}$ alkyl acrylate or methacrylate, with or without an unsaturated carboxylic acid.

6. The composition of claim 3, wherein (B) is a mixture of resin (B1) and resin (B2).

7. The composition of claim 6, wherein (B1) is a copolymer of acrylonitrile or methacrylonitrile with styrene and a $C_{1-18}$ alkyl acrylate or methacrylate, with or without an unsaturated carboxylic acid.

* * * * *

UNITED STATES PATENT AND TRADEMARK OFFICE

CERTIFICATE OF CORRECTION

PATENT NO. : 5,714,542

DATED : February 3, 1998

INVENTOR(S) : Takashi NIINAE, et al.

It is certified that error appears in the above-identified patent and that said Letters Patent is hereby corrected as shown below:

On the title page, item [30] should be:

--[30] Foreign Application Priority Data

Mar. 6, 1995 [JP] Japan .......... 7-074565--

Signed and Sealed this

Seventh Day of April, 1998

Attest:

BRUCE LEHMAN

*Attesting Officer*

*Commissioner of Patents and Trademarks*